(12) United States Patent
Samineni et al.

(10) Patent No.: US 8,575,941 B2
(45) Date of Patent: Nov. 5, 2013

(54) APPARATUS AND METHOD FOR IDENTIFYING A FAULTED PHASE IN A SHUNT CAPACITOR BANK

(75) Inventors: Satish Samineni, Pullman, WA (US); Casper A. Labuschagne, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 422 days.

(21) Appl. No.: 12/555,189

(22) Filed: Sep. 8, 2009

(65) Prior Publication Data
US 2011/0057661 A1   Mar. 10, 2011

(51) Int. Cl.
*G01R 31/08* (2006.01)
(52) U.S. Cl.
USPC ............. 324/521; 361/15; 361/16; 361/17; 361/42; 361/50; 317/12; 324/126
(58) Field of Classification Search
USPC ............. 324/521, 126; 361/15–17, 42, 44–50, 361/65; 317/12
See application file for complete search history.

(56) References Cited

U.S. PATENT DOCUMENTS

| | | | | |
|---|---|---|---|---|
| 3,477,024 | A * | 11/1969 | Pelta | ............................. 324/126 |
| 3,626,281 | A | 12/1971 | Souillard | |
| 3,859,564 | A * | 1/1975 | Zulaski | ............................ 361/17 |
| 3,909,672 | A * | 9/1975 | Lundquist et al. | .............. 361/17 |
| 5,428,549 | A | 6/1995 | Chen | |
| 5,515,227 | A | 5/1996 | Roberts | |
| 6,518,767 | B1 | 2/2003 | Roberts | |
| 6,525,543 | B1 | 2/2003 | Roberts | |
| 6,721,671 | B2 | 4/2004 | Roberts | |
| 6,760,670 | B2 | 7/2004 | Stoupis | |
| 6,785,105 | B2 | 8/2004 | Roberts | |
| 6,919,717 | B2 * | 7/2005 | Ghassemi | ...................... 324/126 |
| 6,934,654 | B2 | 8/2005 | Benmouyal | |
| 7,345,488 | B2 * | 3/2008 | Fischer | ......................... 324/521 |
| 7,616,005 | B2 | 11/2009 | Kalyuzhny | |
| 2004/0021995 | A1 | 2/2004 | Roberts | |

(Continued)

OTHER PUBLICATIONS

Dhillon, Malkiat S., Demetrios A. Tziouvaras, Protection of Fuseless Capacitor Banks Using Digital Relays, http://www.selinc.com/techpprs/useless_capacitors.pfd, Oct. 11, 1999.

(Continued)

*Primary Examiner* — Jermele M Hollington
*Assistant Examiner* — Temilade S Rhodes-Vivour
(74) *Attorney, Agent, or Firm* — Eugene M. Cummings, PC

(57) ABSTRACT

An apparatus and method is provided for identifying a faulted phase in at least one shunt capacitor bank. The apparatus generally includes a sampling circuit for sampling current or voltage signals associated with the shunt capacitor bank. A microcontroller is coupled to the sampling circuit and programmed to measure a compensated neutral point phase angle from the sampled signal, and compare the compensated neutral point phase angle with a fixed reference phase angle to identify the faulted phase of the shunt capacitor bank. The method generally includes the steps of sampling a current or voltage signal associated with the shunt capacitor bank, determining a compensated neutral point phase angle from the sampled signal, and comparing the compensated neutral point phase angle with a fixed reference phase angle to identify the faulted phase of the shunt capacitor bank. The invention also relates to an apparatus and method for identifying the location of the fault (e.g., the section of the bank) in a double ungrounded shunt capacitor bank or double WYE shunt capacitor bank.

34 Claims, 18 Drawing Sheets

(56) References Cited

U.S. PATENT DOCUMENTS

| | | | |
|---|---|---|---|
| 2005/0243491 A1 | 11/2005 | Tanis | |
| 2005/0275397 A1* | 12/2005 | Lightbody et al. | 324/126 |
| 2008/0007230 A1 | 1/2008 | Kalyuzhny | |
| 2008/0109205 A1 | 5/2008 | Nasle | |
| 2008/0291593 A1* | 11/2008 | Day et al. | 361/78 |
| 2008/0291708 A1* | 11/2008 | Teichmann et al. | 363/50 |
| 2009/0073726 A1 | 3/2009 | Babcock | |

OTHER PUBLICATIONS

Schweitzer,III, Edmund O., Jolene Schafman, Unified Shunt Capacitor Bank Control and Protection, http://www.selinc.com/techpprs/6055.pdf, May 1, 1991.

Brunello, Gustavo, Bofdan Kasztenny, Craig Wester, Shunt Capacitor Bank Fundamentals and Protection, 2003 Conference for Protective Relay Engineers—Texas A&M University, College Station, TX, Apr. 3, 2003.

Fleming, Bill, Negative-Sequence Impedance Directional Element, https://www.selinc.com/WorkArea/DownloadAsset.aspx?id=2475, Jun. 20, 2005.

Calero, Fernando, Rebirth of Negative-Sequence Quantities in Protective Relaying With Microprocessor-Based Relays, https://www.selinc.com/WorkArea/DownloadAsset.aspx?id=2805, Jun. 25, 2005.

PCT/US2010/048015, Patent Cooperation Treaty International Search Report and Written Opinion of the International Searching Authority, Nov. 15, 2010.

* cited by examiner

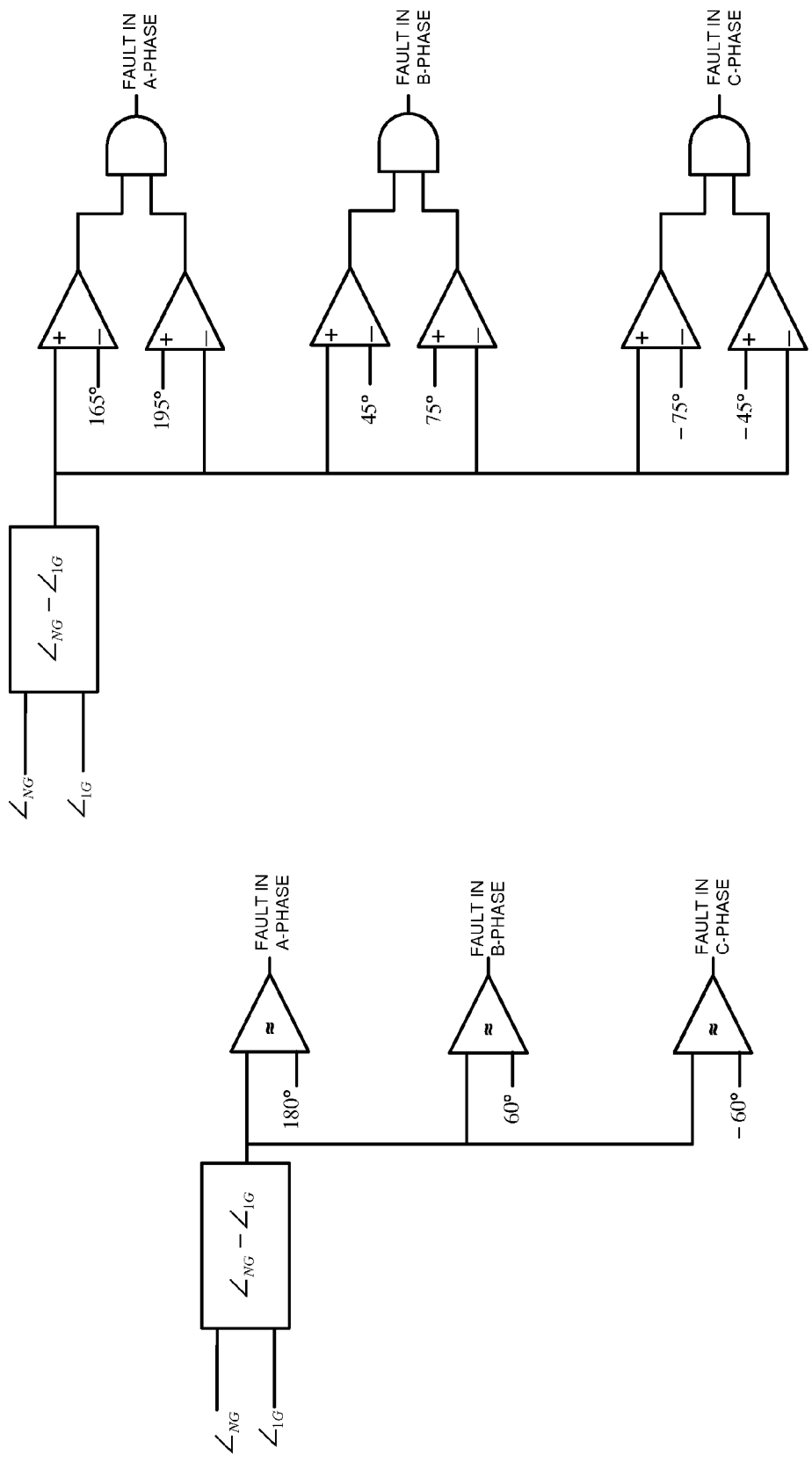

APPARATUS AND METHOD FOR IDENTIFYING A FAULTED PHASE IN A SHUNT CAPACITOR BANK

RELATED APPLICATION

None.

BACKGROUND OF THE INVENTION

The present invention generally relates to power system protection, and more specifically, to an apparatus and method for identifying a faulted phase in a shunt capacitor bank. The invention also relates to an apparatus and method for identifying the location of the fault (e.g., the section of the bank) in a double ungrounded shunt capacitor bank or double WYE shunt capacitor bank.

Electric utility systems or power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems must also include protective devices and procedures to protect the power system elements from abnormal conditions such as electrical short circuits, overloads, frequency excursions, voltage fluctuations, and the like.

Such protective devices and procedures act to isolate some power system element(s) from the remainder of the power system upon detection of the abnormal condition or a fault in, or related to, the power system element(s).

Power system protection may be grouped into six types including: (1) generators and generator-transformer elements (2) transformers, (3) buses, (4) lines (transmission, sub-transmission and distribution), (5) utilization equipment (motors, static loads), and (6) capacitor or reactor banks. As a result, a variety of protective devices are required. Such protective devices may include different types of protective relays, surge protectors, arc gaps and associated circuit breakers and reclosers.

Shunt capacitor banks generally provide capacitive reactive power support/compensation in high or low voltage power transmission systems. Shunt capacitor banks generally comprise a plurality of series/parallel connected capacitor units. Within each capacitor unit are groups of series/parallel-connected capacitors, called capacitor elements. Capacitor elements can be either fused (internally fused) or not fused. Shunt capacitor banks may be either fused or not fused. Fused shunt capacitor banks may be either externally or internally fused (fuses within each capacitor unit).

For externally fused shunt capacitor banks, fuses are externally mounted between at least one of the capacitor units and a capacitor bank fuse bus. If one of the capacitors in a capacitor unit fails, there is an increased voltage and current across the other capacitors in the capacitor unit. Multiple failures in a plurality of capacitors in the capacitor unit cause the fuse to blow, interrupting the fault current. The blown fuse also provides visual identification of the faulted capacitor unit. There is no indication of failed capacitor element(s).

For internally fused shunt capacitor banks, fuses are connected to each of the capacitor elements inside of the capacitor unit. If one of the capacitor elements fails, the fuse interrupts the excessive current and isolates the failed capacitor element. When the failed capacitor element is isolated, there is an increased voltage and current across the other capacitors connected in parallel in the same group in the capacitor unit. There is no visual indication of the failed capacitor element(s) or unit(s).

For fuseless shunt capacitor banks, capacitor units are connected in series strings between phase and neutral. Fuseless shunt capacitor banks are generally applied to systems having voltages of greater than about 34.5 kV. Failure of a capacitor in a capacitor unit shorts a group associated with the failed capacitor. When the short isolates the capacitor group in the capacitor unit, there is an increased voltage and current across the other capacitors in the capacitor unit. There is no visual indication of the failed capacitor element(s) or unit(s).

For unfused shunt capacitor banks, capacitor units are connected using a series/parallel connection of the capacitor units. Unfused shunt capacitor banks are generally applied to systems having voltages of less than about 34.5 kV. There is no visual indication of the failed capacitor element(s) or unit(s).

It is desired that the maintenance time for shunt capacitor banks be as short as possible. Accordingly, it is preferred that a fault in a capacitor unit be identified as soon as possible. Protective devices may be used to identify faults in capacitor units. For shunt capacitor bank applications, a protective device must not only detect the presence of a fault, but must also determine which of the three power system phases is faulted.

When the shunt capacitor bank is grounded, the faulted phase is found by determining whether there is a voltage differential across each phase. However, determining the faulted phase in an ungrounded shunt capacitor bank is more difficult. Accordingly, it is an object of the present invention to provide a protective device which determines a failure in a capacitor unit by identifying the faulted phase and section in an ungrounded shunt capacitor bank.

These and other desired benefits of the preferred embodiments, including combinations of features thereof, of the invention will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the multiple embodiments of the invention, not necessarily the invention in general.

SUMMARY OF INVENTION

According to an aspect of the invention, disclosed is an apparatus and method for identifying a faulted phase in at least one shunt capacitor bank. The apparatus may be used to monitor and protect capacitor arrangements which are fused or not fused. The apparatus may further be used for single WYE type, double WYE type, H bridge type, or other comparable arrangements. The apparatus generally includes a sampling circuit for sampling current or voltage signals associated with the shunt capacitor bank. A microcontroller is coupled to the sampling circuit and programmed to measure a compensated neutral point phase angle from the sampled signal, and compare the compensated neutral point phase angle with a fixed reference phase angle to identify the faulted phase and section of the shunt capacitor bank. The apparatus may further provide an alarm or control signal after identifying the faulted phase.

In accordance with another aspect of the invention, the fixed reference phase is the positive-sequence phase angle. The apparatus may also be adapted to compensate for unbalances outside of the capacitor bank. For example, blinders may be used to compensate for such unbalances.

A method is also described for identifying the faulted phase and section in an ungrounded shunt capacitor bank which includes the steps of sampling current or voltage signals associated with the shunt capacitor bank, determining a compensated neutral point phase angle from the sampled signal, and comparing the compensated neutral point phase angle with a fixed reference phase angle to identify the faulted phase of the shunt capacitor bank.

BRIEF DESCRIPTION OF THE DRAWINGS

FIG. 9 is a logic diagram of protective device logic that may be used for identifying a faulted phase in an ungrounded shunt capacitor bank in a single WYE arrangement which is fused.

DETAILED DESCRIPTION OF THE MULTIPLE EMBODIMENTS OF THE PRESENT INVENTION

This invention relates to an apparatus and method for identifying a faulted phase in a shunt capacitor bank. The invention also relates to an apparatus and method for identifying the location of the fault (e.g., the section of the bank) in a double ungrounded shunt capacitor bank or double WYE shunt capacitor bank.

Figure 1:
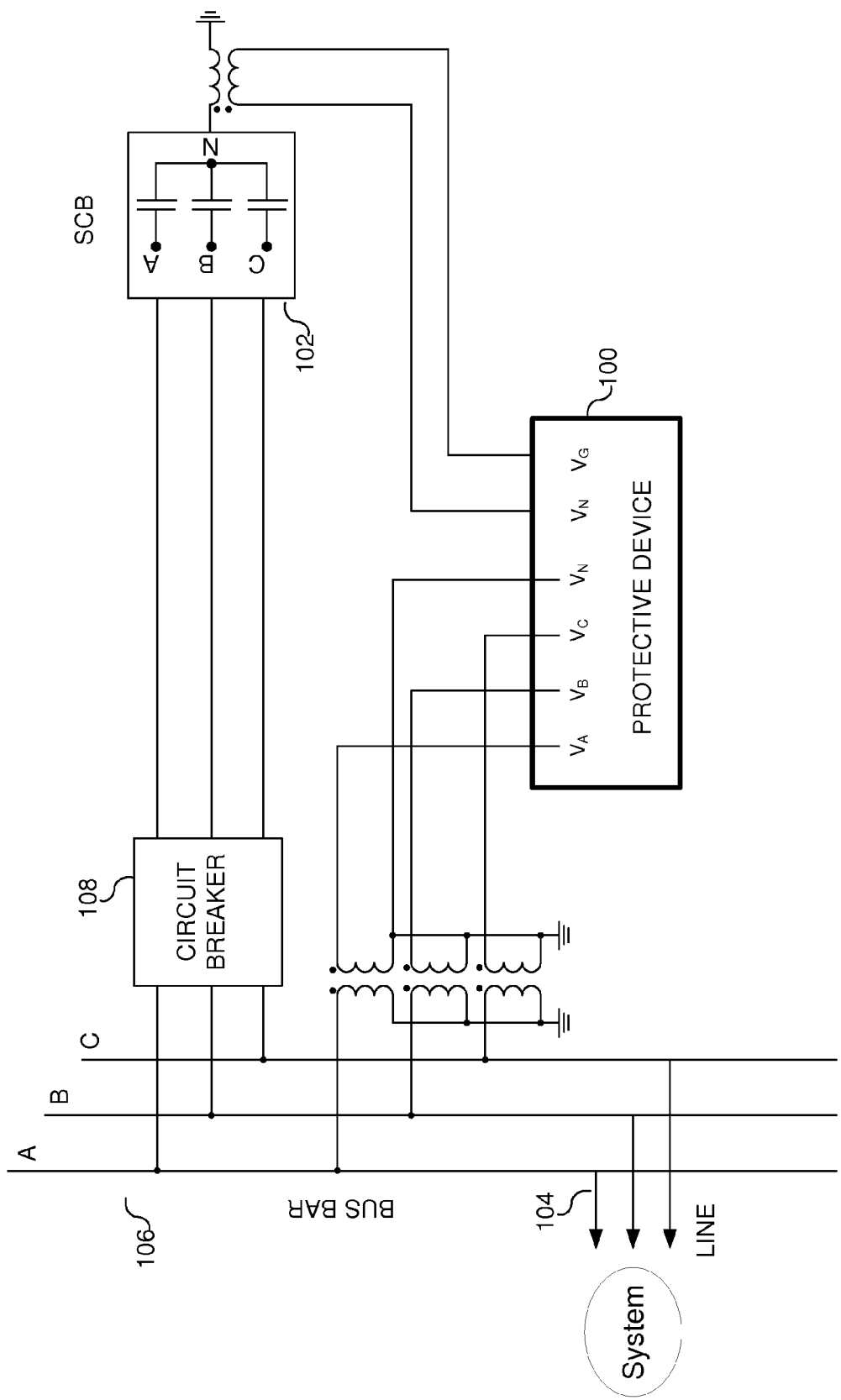
FIG. 1 is a block diagram of a protective device for identifying a faulted phase in an ungrounded shunt capacitor bank.

FIG. 1 is an illustration of an ungrounded shunt capacitor bank having a plurality of capacitor units connected in a single WYE arrangement. A protective device 100 may be adapted to identify the faulted phase in the ungrounded shunt capacitor bank 102. As illustrated, the protective device 100 is operatively coupled to the busbar 106 via a number of transformer groups to monitor the A-phase, the B-phase and the C-phase primary sinusoidal voltage signals. Also, the protective device 100 is operatively coupled to the neutral point of the capacitor bank via a transformer to monitor the neutral to ground voltage of the bank.

For a balanced power system, the A-phase, B-phase, and C-phase have a phase shift of 120 degrees. For example, under balanced conditions, the three phases have angles of $\angle 0°$, $\angle -120°$, and $\angle 120°$, respectively (assuming the power system phase rotation is ABC).

The protective device 100 determines whether there is a fault in the shunt capacitor bank 102 by using a neutral voltage unbalance protection method. More specifically, the protective device 102 measures the neutral point voltage, zero-sequence voltage at busbar 106 and positive-sequence voltage at busbar 106. The measured zero-sequence voltage represents the system voltage unbalance. The measured neutral point voltage represents system voltage unbalance and inherent unbalance in the capacitor bank. In order to calculate the inherent unbalance in the capacitor bank, the protective device 100 subtracts the zero-sequence voltage from the neutral point voltage (assuming the transforming ratios are unity otherwise the zero-sequence voltage is normalized). By accounting for this inherent unbalance, a fault in the capacitor bank will result in a compensated neutral voltage (VNG). Under normal conditions, the compensated neutral voltage magnitude will be zero. However, a fault in any one of the phases will result in a compensated neutral voltage magnitude. If there is a compensated neutral voltage magnitude, then the protective device 100 uses the phase angle of the compensated neutral voltage ($\angle_{NG}$) and the positive-sequence phase angle ($\angle_{1G}$) at the busbar 106 which is a reference to determine which phase has the fault. The protective device 100 may be adapted to ascertain the reference phase angle from an associated voltage signal and/or current signal, or any transformation thereof including alpha-beta-gamma or d-q-0 or symmetrical components or any mathematical derivatives of those like sum, difference, product, scaling etc. of the voltage signal and/or current signal.

Figure 2:
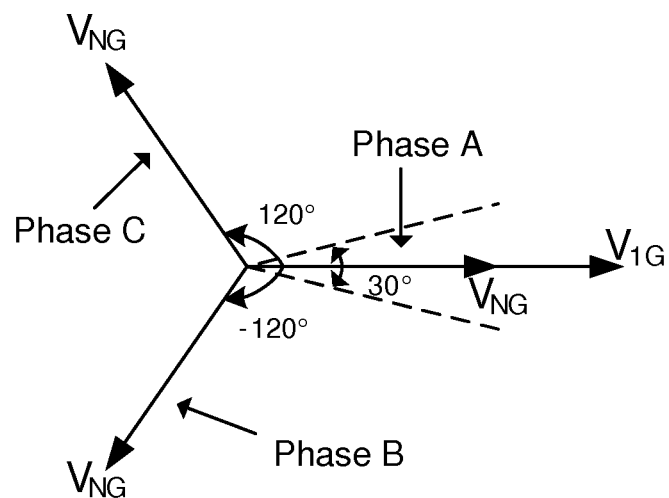
FIG. 2 is a phase angle diagram for different unbalances if the shunt capacitor bank of FIG. 1 is not fused.

FIG. 2 illustrates a phase angle diagram for different unbalances if the shunt capacitor bank 102 of FIG. 1 is not fused. In the arrangement of FIG. 2, the power system phase rotation is ABC. If the shunt capacitor bank 102 is not fused and the compensated neutral voltage (VNG) magnitude is non zero then the protective device 100 compares the compensated neutral voltage phase angle ($\angle_{NG}$) and the positive-sequence voltage phase angle ($\angle_{1G}$) at the busbar 106. If the protective device 100 determines that the compensated neutral voltage angle ($\angle_{NG}$) is in phase with the positive-sequence voltage phase angle ($\angle_{1G}$), there is a fault in the capacitors associated with Phase-A. If the protective device 100 determines that the compensated neutral voltage angle ($\angle_{NG}$) is about −120° out of the positive-sequence voltage phase angle ($\angle_{1G}$), there is a fault in the capacitors associated with Phase-B. If the protective device 100 determines that the compensated neutral voltage angle ($\angle_{NG}$) is about 120° out of the positive-sequence voltage phase angle ($\angle_{1G}$), there is a fault in the capacitors associated with Phase-C.

Figure 3:
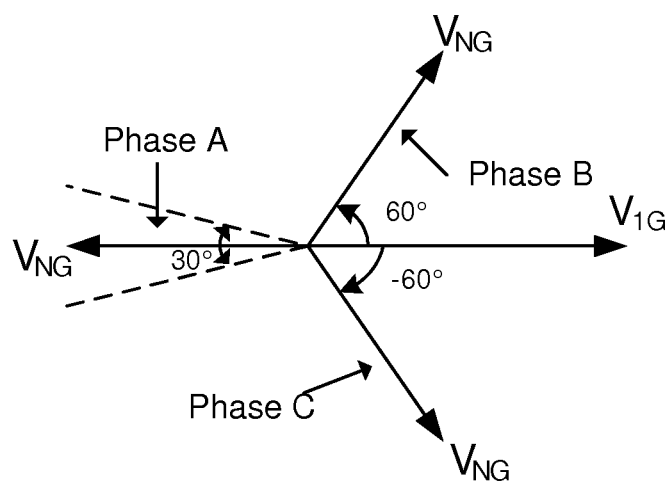
FIG. 3 is a phase angle diagram for different unbalances if the shunt capacitor bank of FIG. 1 is fused.

FIG. 3 illustrates a phase angle diagram for different unbalances if the shunt capacitor bank 102 of FIG. 1 is fused. If the shunt capacitor bank 102 is fused and the compensated neutral voltage (VNG) magnitude is non zero, then the protective device 100 compares the compensated neutral voltage phase angle ($\angle_{NG}$) and the positive-sequence voltage phase angle ($\angle_{1G}$) at the busbar 106. If the protective device 100 determines that the compensated neutral voltage angle ($\angle_{NG}$) is 180° out of phase with the positive-sequence voltage phase angle ($\angle_{1G}$), there is a fault in the capacitors associated with Phase-A. If the protective device 100 determines that the compensated neutral voltage angle ($\angle_{NG}$) is about 60° out of phase with the positive-sequence voltage phase angle ($\angle_{1G}$), there is a fault in the capacitors associated with Phase-B. If the protective device 100 determines that the compensated neutral voltage angle ($\angle_{NG}$) is about −60° out of phase with the positive-sequence voltage phase angle ($\angle_{1G}$), there is a fault in the capacitors associated with Phase-C.

The protective device 100 may optionally include a blinder to compensate for any unbalance not arising from a fault in the capacitor bank. For example, the protective device 100 may include about a ±15° blinder to compensate for any unbalance not arising from a fault in the capacitor bank.

After identifying a faulted phase in the shunt capacitor bank, the protective device 100 may be adapted to provide an alarm and/or data to be included in a report.

Figure 4:
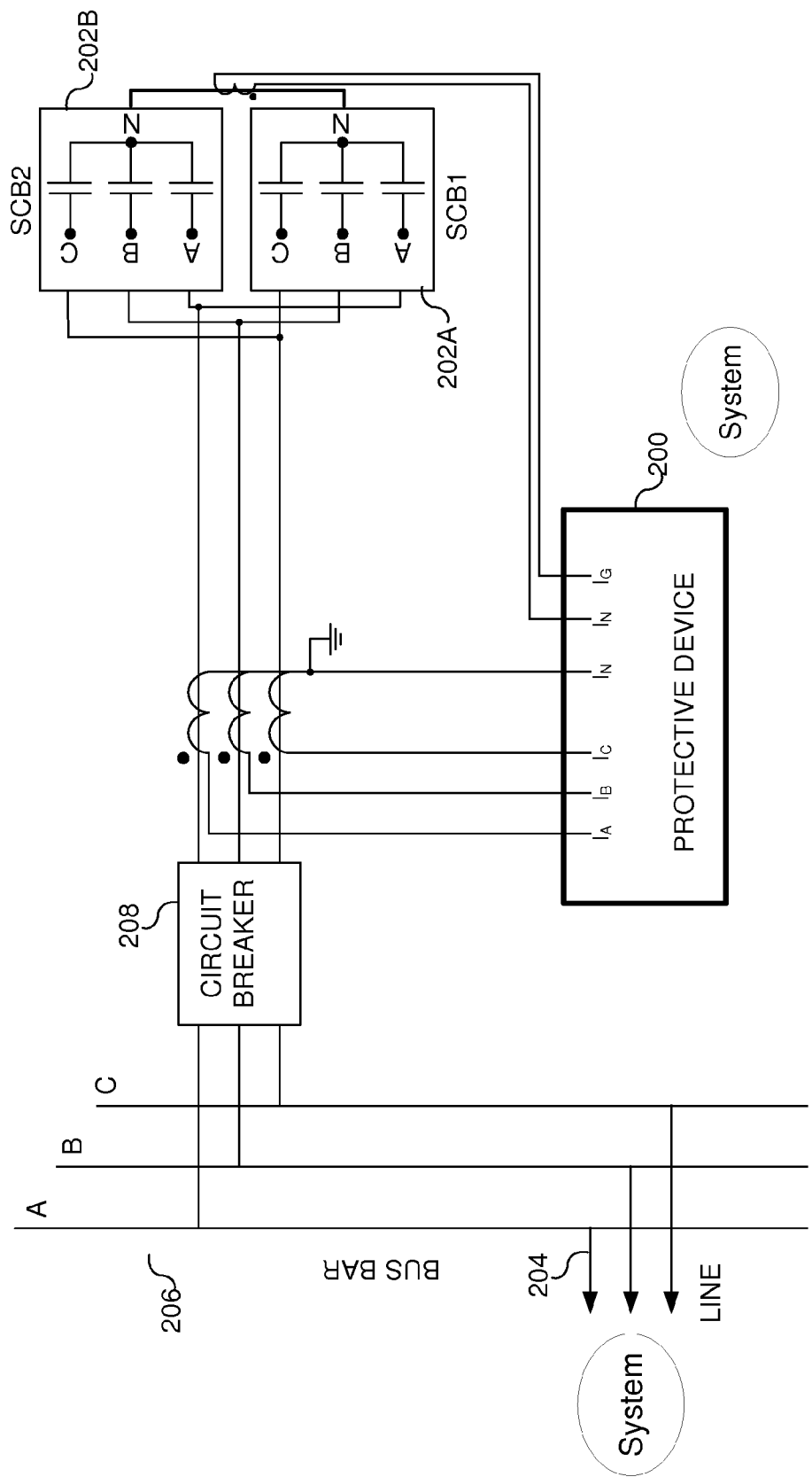
FIG. 4 is a block diagram of a protective device for identifying a faulted phase and section in a double-wye (at least two sections) ungrounded, shunt capacitor bank.

FIG. 4 is an illustration of two portions of an ungrounded shunt capacitor bank 202a, 202b having a plurality of capacitor units connected in a double WYE arrangement. A protective device 200 may be adapted to identify the faulted phase in the ungrounded shunt capacitor banks 202a, 202b. As illustrated, the protective device 200 is operatively coupled via a number of transformer groups to monitor the A-phase, the B-phase and the C-phase primary sinusoidal current signals. Also, the protective device 200 is operatively coupled to the neutral point of the capacitor bank via a transformer to monitor the neutral current of the bank.

The protective device 200 determines whether there is a fault in the shunt capacitor banks 202a, 202b by using a neutral current unbalance protection method. More specifically, the protective device 202 measures the neutral current and the positive-sequence current. The measured neutral current represents inherent unbalance in the capacitor bank. By accounting for this standing inherent unbalance, a fault in the capacitor bank will result in a compensated neutral current (ING). Under normal conditions, the compensated neutral current (ING) magnitude will be zero. However, a fault in any one of the phases will result in a compensated neutral current magnitude. If there is a compensated neutral current magnitude, then the protective device uses the phase angle of the compensated neutral current ($\angle_{NG}$) and the positive-sequence phase angle ($\angle_{1G}$) which is a reference to determine which phase has the fault. The protective device 200 may be adapted to ascertain the reference phase angles from an associated voltage signal and/or current signal, or any transformation thereof including alpha-beta-gamma or d-q-0 or symmetrical components or any mathematical derivatives of those like sum, difference, product, scaling etc. of the voltage signal and/or current signal. For example, the protective device 200 may be adapted to ascertain the phase angle and magnitude at a neutral point current ($I_N$) and the positive sequence current ($I_1$) from the associated current signal as illustrated in FIGS. 5 and 6.

Figure 5:
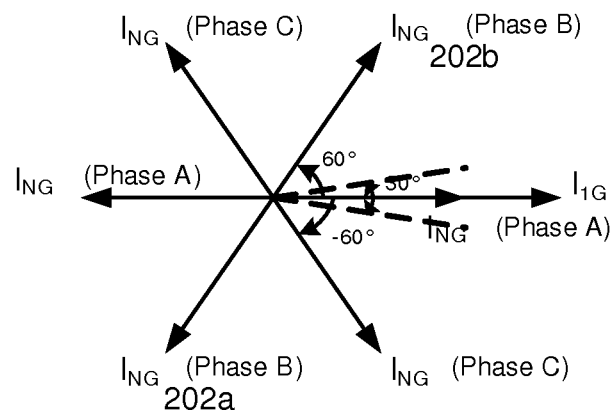
FIG. 5 is a phase angle diagram for different unbalances if the shunt capacitor banks of FIG. 4 are not fused.
Figure 6:
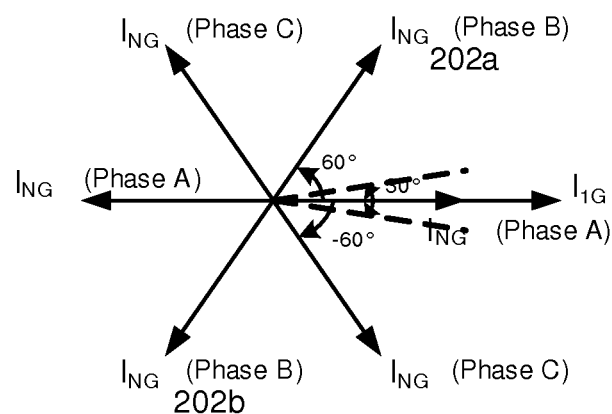
FIG. 6 is a phase angle diagram for different unbalances if the shunt capacitor banks of FIG. 4 are fused.

FIG. 5 illustrates a phase angle diagram for different unbalances if the shunt capacitor bank 202 of FIG. 4 is not fused. If the shunt capacitor bank portions 202a, 202b are not fused and there is an unbalance therein, the protective device 200 compares the phase angle of the compensated neutral current ($\angle_{NG}$) with the positive-sequence current phase angle ($\angle_{1G}$). If the protective device 200 determines that the phase angle of the compensated neutral current ($\angle_{NG}$) is in phase with the positive-sequence current phase angle ($\angle_{1G}$), there is a fault in the capacitors associated with Phase-A in shunt capacitor bank 202a. If the protective device 200 determines that the phase angle of the compensated neutral current ($\angle_{NG}$) is about 180° out of phase with the positive-sequence current phase angle ($\angle_{1G}$), there is a fault in the capacitors associated with Phase-A in shunt capacitor bank 202b.

If the protective device 200 determines that the phase angle of the compensated neutral current ($\angle_{NG}$) is about −120° out of phase with the positive-sequence current phase angle ($\angle_{1G}$), there is a fault in the capacitors associated with Phase-B in shunt capacitor bank 202a. If the protective device 200 determines that the phase angle of the compensated neutral current ($\angle_{NG}$) is about 60° out of phase with the positive-sequence current phase angle ($\angle_{1G}$), there is a fault in the capacitors associated with Phase-B in shunt capacitor bank 202b.

If the protective device 200 determines that the phase angle of the compensated neutral current ($\angle_{NG}$) is about 120° out of phase with the positive-sequence current phase angle ($\angle_{1G}$), there is a fault capacitors associated with Phase-C in shunt capacitor bank 202a. If the protective device 200 determines that the phase angle of the compensated neutral current ($\angle_{NG}$) is about −60° out of phase with the positive-sequence current phase angle ($\angle_{1G}$), there is a fault in the capacitors associated with Phase-C in shunt capacitor bank 202b.

FIG. 6 illustrates a phase angle diagram for different unbalances if the shunt capacitor bank 202 of FIG. 4 is fused. If the shunt capacitor banks 202a, 202b are fused and there is an unbalance therein, the protective device 200 compares the phase angle of the compensated neutral current ($\angle_{NG}$) with the positive sequence current phase angle ($\angle_{1G}$). If the protective device 200 determines that the phase angle of the compensated neutral current ($\angle_{NG}$) is in phase with the positive sequence current phase angle ($\angle_{1G}$), there is a fault in the capacitors associated with Phase-A in shunt capacitor bank 202b. If the protective device 200 determines that the phase angle of the compensated neutral current ($\angle_{NG}$) is about 180° out of phase with the positive sequence current phase angle ($\angle_{1G}$), there is a fault in the capacitors associated with Phase-A in shunt capacitor bank 202a.

If the protective device 200 determines that the phase angle of the compensated neutral current ($\angle_{NG}$) is about −120° out of phase with the positive-sequence current phase angle ($\angle_{1G}$), there is a fault in the capacitors associated with Phase-B in shunt capacitor bank 202b. If the protective device 200 determines that the phase angle of the compensated neutral current ($\angle_{NG}$) is about 60° out of phase with the positive-sequence current phase angle ($\angle_{1G}$), there is a fault in the capacitors associated with Phase-B in shunt capacitor bank 202a.

If the protective device 200 determines that the phase angle of the compensated neutral current ($\angle_{NG}$) is about 120° out of phase with the positive-sequence current phase angle ($\angle_{1G}$), there is a fault in the capacitors associated with Phase-C in shunt capacitor bank 202b. If the protective device 200 determines that the phase angle of the compensated neutral current ($\angle_{NG}$) is about −60° out of phase with the positive-sequence current phase angle ($\angle_{1G}$), there is a fault in the capacitors associated with Phase-C in shunt capacitor bank 202a.

The protective device 200 may optionally include a blinder to compensate for any unbalance not arising from a fault in the capacitor banks 202a, 202b. For example, the protective device 200 may include about a ±15° blinder to compensate for any unbalance not arising from a fault in the capacitor banks 202a, 202b.

After identifying a faulted phase in the shunt capacitor bank, the protective device 200 may be adapted to provide an alarm and/or include it in the report.

Figure 7:
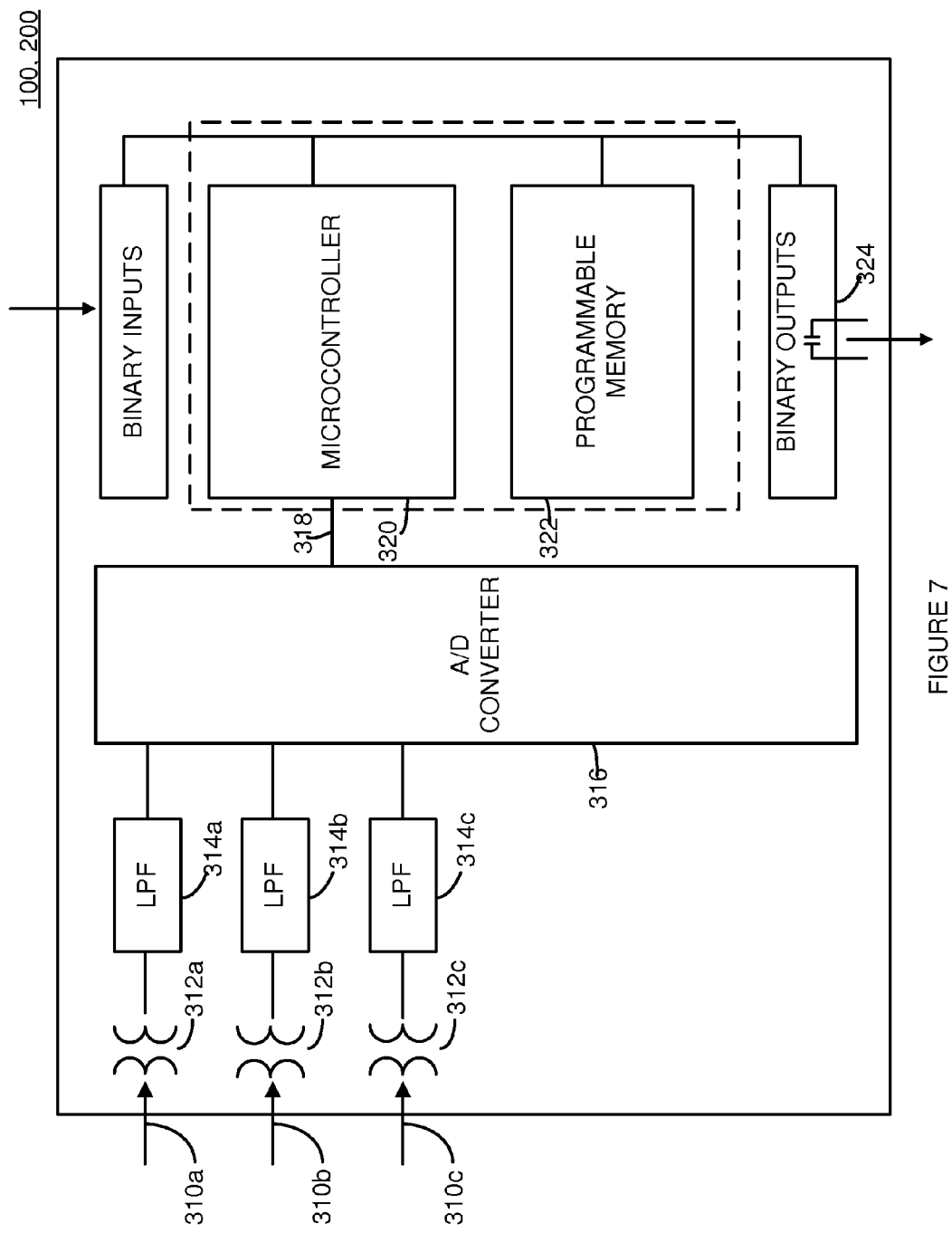
FIG. 7 is a block diagram of a configuration of the protective device of FIGS. 1 and 4.

FIG. 7 is a block diagram of an exemplary configuration of the protective device 100 or 200 of FIGS. 1 and 4. In general, the protective device 100, 200 processes each of the A-phase, B-phase and C-phase sinusoidal voltage or current samples 310a, b, c provided by the voltage or current transformer group 312a, b, c to determine corresponding A-phase, B-phase and C-phase angles and magnitudes. More specifically, the voltage or current signals 310a, b, c are filtered using filters 314a, b, c and then digitized with A/D converter 316 to form digitized signal sample streams 318 suitable for use by a microcontroller 320 (or field programmable gate array-FPGA). The microcontroller 320 processes the digitized signal sample streams 318 to determine whether there is an unbalance in the shunt capacitor bank. If there is an unbalance, the microcontroller 320 identifies the faulted phase in an ungrounded shunt capacitor bank.

Instructions for processing the sample streams 318 may be stored in programmable memory 322. The programmable memory 322 may be adapted such that the instructions stored therein may be adapted as desired. In one example, instructions may be stored for processing sample streams 318 for an ungrounded shunt capacitor bank in an ungrounded single WYE arrangement, wherein the microcontroller 320 determines the phase angle of the compensated neutral voltage ($\angle_{NG}$) and the positive sequence voltage phase angle ($\angle_{1G}$) at the busbar 106 from these sample streams 318. Alternatively, instructions may be stored for processing sample streams 318 for at least two portions of a shunt capacitor bank in an ungrounded, double WYE arrangement, wherein the microcontroller 320 determines the phase angle of the compensated neutral current ($\angle_{NG}$) and the positive-sequence phase angle ($\angle_{1G}$) from these sample streams 318.

In another example, instructions may be stored for processing the sample streams 318 based on whether the shunt capacitor bank is fused or unfused as described with respect to FIGS. 2 and 3 for a capacitor bank in a single WYE arrangement. Alternatively, instructions may be stored for processing the sample streams 318 based on whether the shunt capacitor banks are fused or unfused as described with respect to FIGS. 5 and 6 for at least two capacitor banks in a double WYE arrangement.

In yet another example, instructions may be stored for calculating transformations of the voltage or current sample streams 318 including alpha-beta-gamma or d-q-0 or symmetrical components or any mathematical derivatives of those like sum, difference, product, scaling etc. Such transformations may be used in other control, automation, monitoring or protection functions.

After identifying a faulted phase in the shunt capacitor bank, the microprocessor may be adapted to provide an alarm, data to be included in a report, and/or a report including associated data via binary outputs 324. Instructions for alarm and/or reports may be stored in programmable memory 322. Other control, automation, monitoring or protection functions may also be performed via the binary output 324.

Figure 8B:
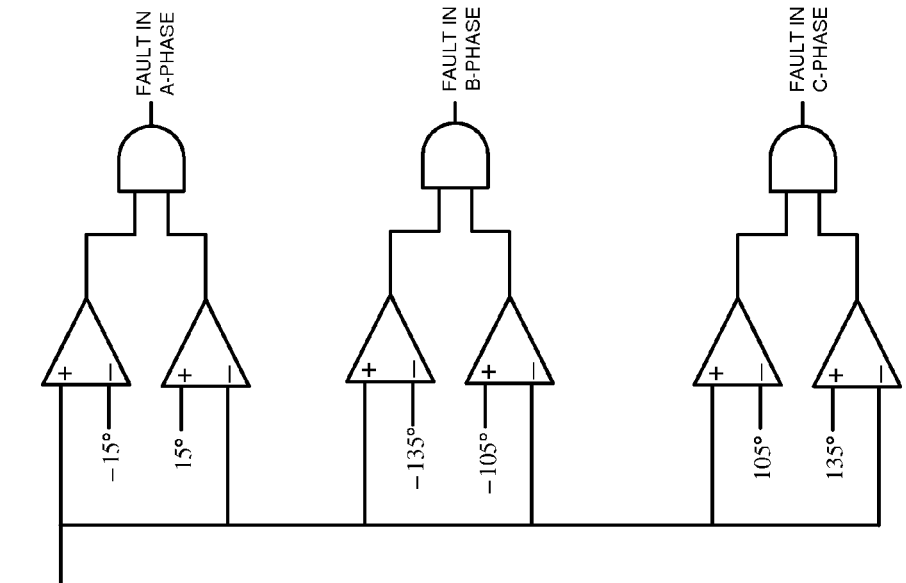
FIG. 8 is a logic diagram of protective device logic that may be used for identifying a faulted phase in an ungrounded shunt capacitor bank in a single WYE arrangement which is not fused.
Figure 8A:
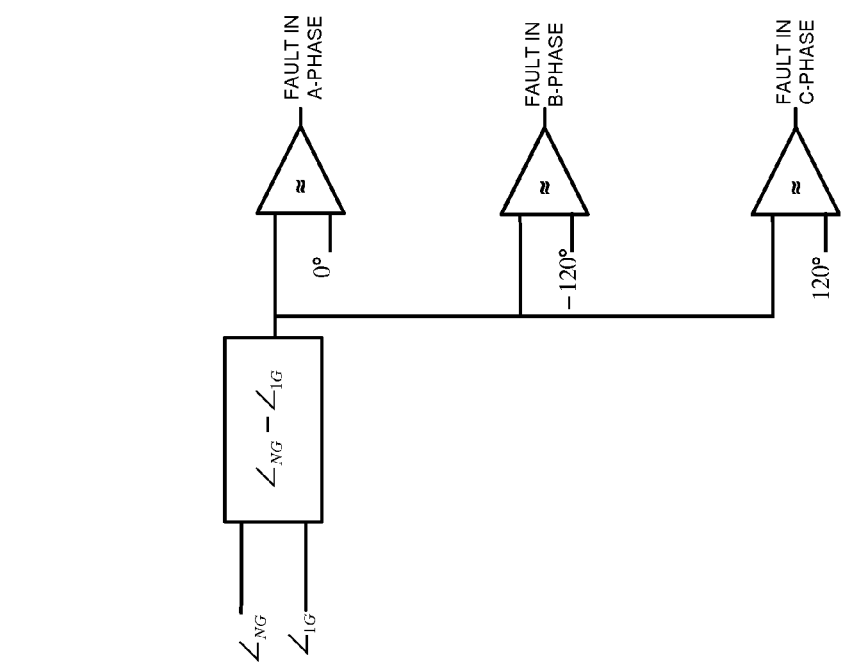

FIG. 8 is a logic diagram of protective device logic that may be used to identify the faulted phase of an ungrounded shunt capacitor bank in a single WYE arrangement and is not fused after it is determined that there is an unbalance in the system. In this arrangement, the phase angle of the compensated neutral voltage ($\angle_{NG}$) is compared with the positive-sequence voltage phase angle ($\angle_{1G}$) at the busbar. If the compensated neutral voltage ($\angle_{NG}$) is in phase with the positive sequence voltage phase angle ($\angle_{1G}$), there is a fault in the capacitors associated with Phase-A. If the compensated neutral voltage ($\angle_{NG}$) is about −120° out of phase with the positive-sequence voltage phase angle ($\angle_{1G}$), there is a fault in the capacitors associated with Phase-B. If the compensated neutral voltage ($\angle_{NG}$) is about 120° out of phase with the positive sequence-voltage phase angle ($\angle_{1G}$), there is a fault in the capacitors associated with Phase-C.

FIG. 9 is a logic diagram of protective device logic that may be used to identify the faulted phase of an ungrounded shunt capacitor bank in a single WYE arrangement and is fused after it is determined that there is an unbalance in the system. In this arrangement, the phase angle of the compensated neutral voltage ($\angle_{NG}$) is compared with the positive sequence voltage phase angle ($\angle_{1G}$) at the busbar. If the compensated neutral voltage ($\angle_{NG}$) is 180° out of phase with the positive-sequence voltage phase angle ($\angle_{1G}$), there is a fault in the capacitors associated with Phase-A. If the compensated neutral voltage ($\angle_{NG}$) is about 60° out of phase with the positive-sequence voltage phase angle ($\angle_{1G}$), there is a fault in the capacitors associated with Phase-B. If the compensated neutral voltage ($\angle_{NG}$) is about −60° out of phase with the positive-sequence voltage phase angle ($\angle_{1G}$), there is a fault in the capacitors associated with Phase-C.

Figure 10A:
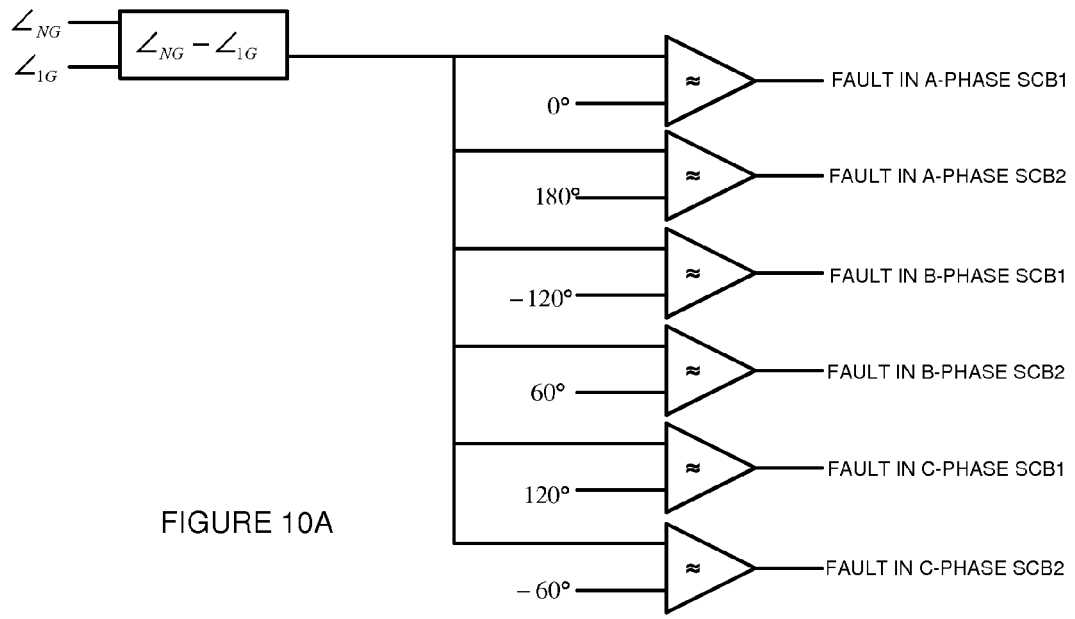
FIG. 10 is a logic diagram of protective device logic that may be used for identifying a faulted phase and section in at least two ungrounded shunt capacitor banks in a double WYE arrangement which are not fused.
Figure 10B:
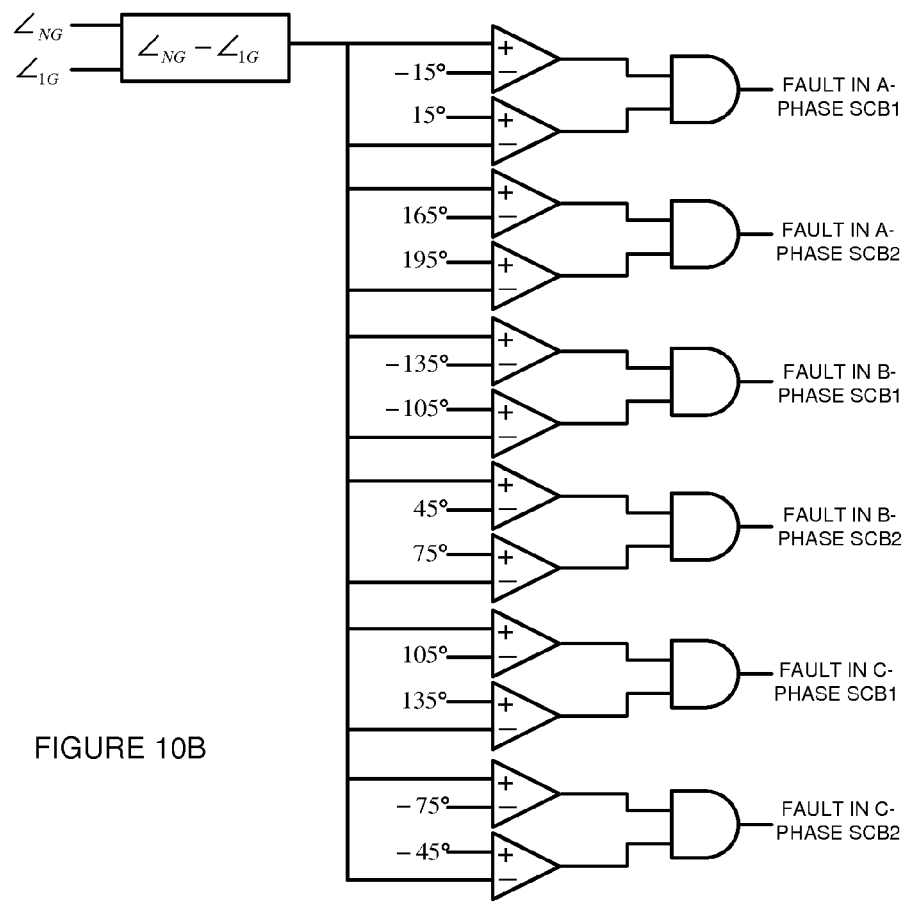

FIG. 10 is a logic diagram of protective device logic that may be used to identify the faulted phase of at least two ungrounded shunt capacitor banks in a double WYE arrangement and are not fused after it is determined that there is an unbalance in the system. In this arrangement, the phase angle of the compensated neutral current ($\angle_{NG}$) is compared with the positive-sequence current phase angle ($\angle_{1G}$) at the busbar. If the phase angle of the compensated neutral current ($\angle_{NG}$) is in phase with the positive-sequence current phase angle ($\angle_{1G}$), there is a fault in the capacitors associated with Phase-A in the first shunt capacitor bank. If the phase angle of the compensated neutral current ($\angle_{NG}$) is about 180° out of phase with the positive-sequence current phase angle ($\angle_{1G}$), there is a fault in the capacitors associated with Phase-A in the other capacitor bank. If the phase angle of the compensated neutral current ($\angle_{NG}$) is about −120° out of phase with the positive-sequence current phase angle ($\angle_{1G}$), there is a fault in the capacitors associated with Phase-B in the first shunt capacitor bank. If the phase angle of the compensated neutral current ($\angle_{NG}$) is about 60° out of phase with the positive sequence current phase angle ($\angle_{1G}$), there is a fault in the capacitors associated with Phase-B in the other shunt capacitor bank. If the phase angle of the compensated neutral current ($\angle_{NG}$) is about 120° out of phase with the positive-sequence current phase angle ($\angle_{1G}$), there is a fault in the capacitors associated with Phase-C in first shunt capacitor bank. If the phase angle of the compensated neutral current ($\angle_{NG}$) is about −60° out of phase with the positive-sequence current phase angle ($\angle_{1G}$), there is a fault in the capacitors associated with Phase-C in the other shunt capacitor bank.

Figure 11A:
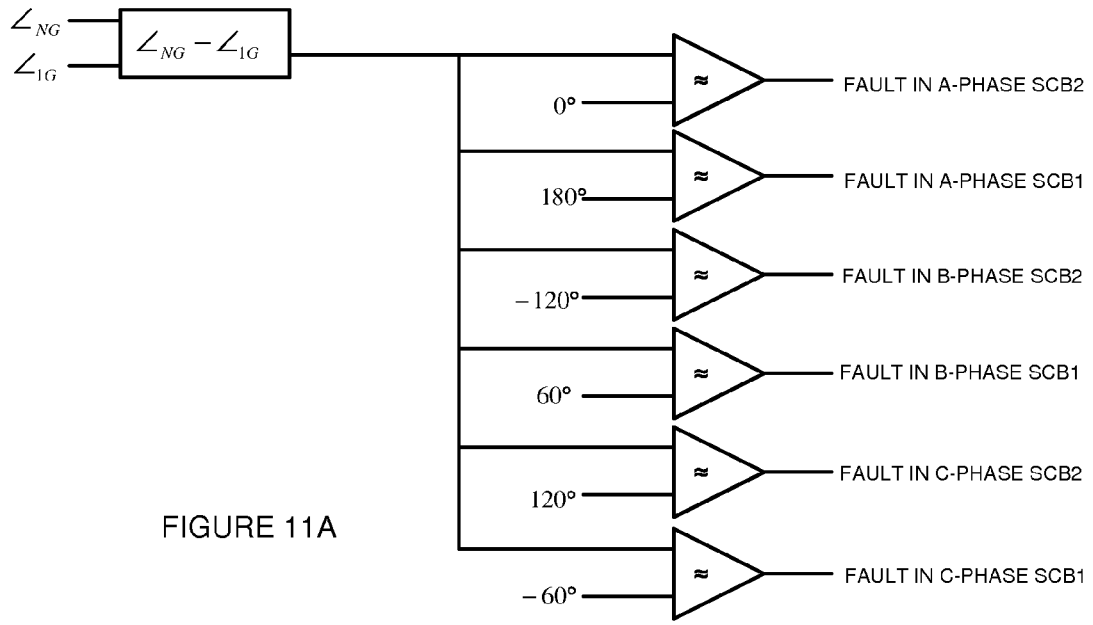
FIG. 11 is a logic diagram of protective device logic that may be used for identifying a faulted phase and section in at least two ungrounded shunt capacitor banks in a double WYE arrangement which are fused.
Figure 11B:
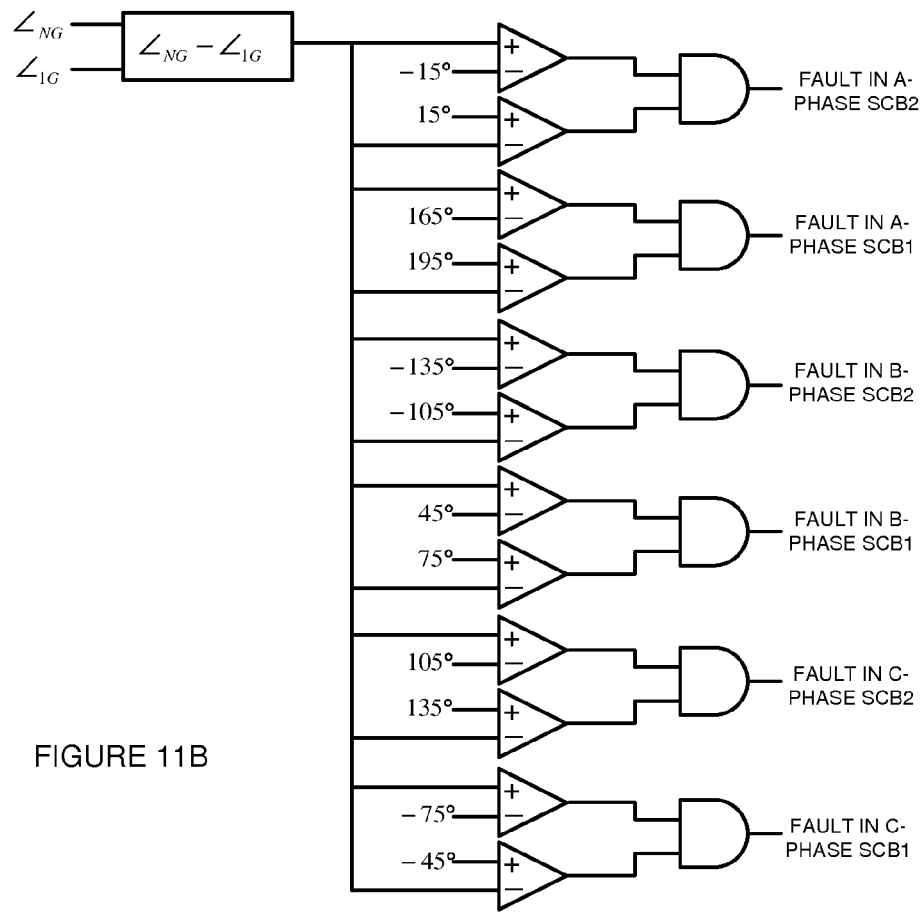

FIG. 11 is a logic diagram of protective device logic that may be used to identify the faulted phase of a first and second ungrounded shunt capacitor bank in a double WYE arrangement and are fused after it is determined that there is an unbalance in the system. In this arrangement, the phase angle of the compensated neutral current ($\angle_{NG}$) is compared with the positive-sequence current phase angle ($\angle_{1G}$) at the busbar. If the phase angle of the compensated neutral current ($\angle_{NG}$) is in phase with the positive-sequence current phase angle ($\angle_{1G}$), there is a fault in the capacitors associated with Phase-A in the second shunt capacitor bank. If the phase angle of the compensated neutral current ($\angle_{NG}$) is about 180° out of phase with the positive-sequence current phase angle ($\angle_{1G}$), there is a fault in the capacitors associated with Phase-A in the first capacitor bank. If the phase angle of the compensated neutral current ($\angle_{NG}$) is about −120° out of phase with the positive-sequence current phase angle ($\angle_{1G}$), there is a fault in the capacitors associated with Phase-B in the second shunt capacitor bank. If the phase angle of the compensated neutral current ($\angle_{NG}$) is about 60° out of phase with the positive-sequence current phase angle ($\angle_{1G}$), there is a fault in the capacitors associated with Phase-B in the first shunt capacitor bank. If the phase angle of the compensated neutral current ($\angle_{NG}$) is about 120° out of phase with the positive-sequence current phase angle ($\angle_{1G}$), there is a fault in the capacitors associated with Phase-C in second shunt capacitor bank. If the phase angle of the compensated neutral current ($\angle_{NG}$) is about −60° out of phase with the positive-sequence current phase angle ($\angle_{1G}$), there is a fault in the capacitors associated with Phase-C in the first shunt capacitor bank.

Example 1

Figure 12:
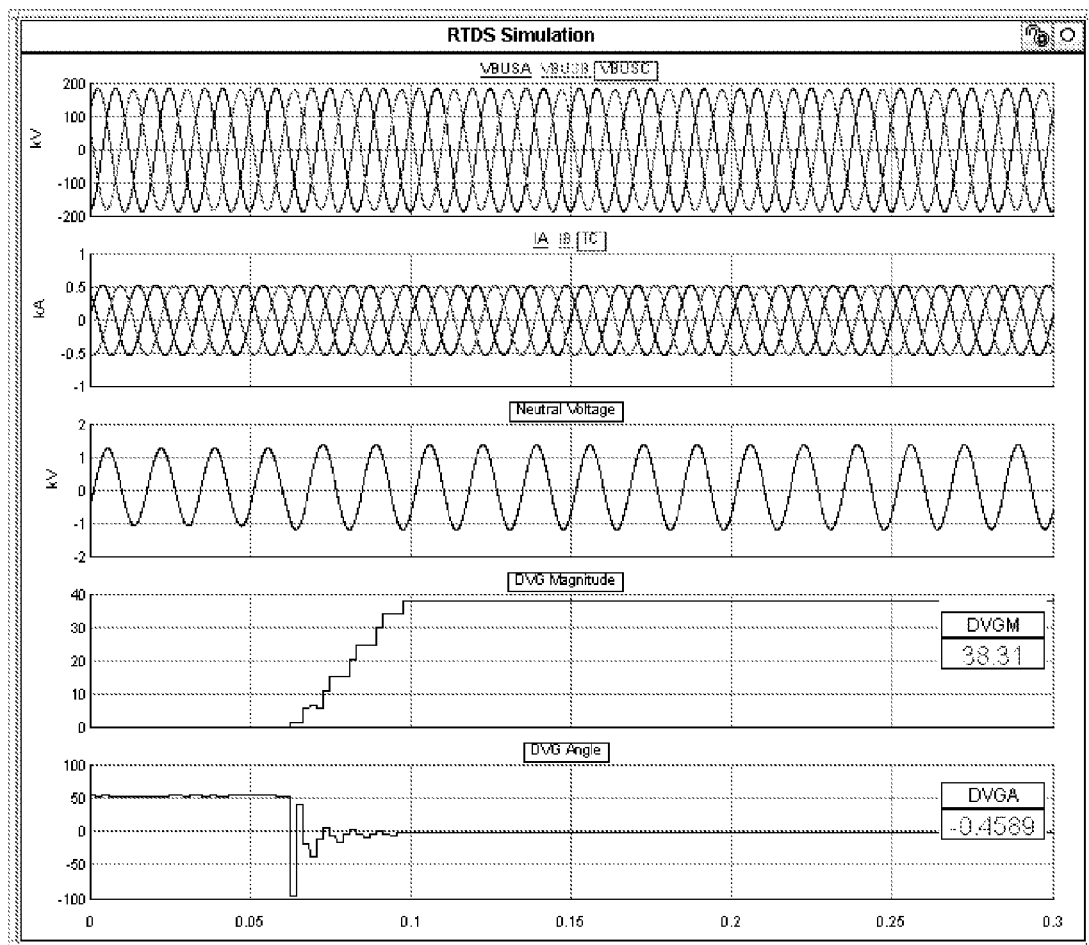
FIG. 12 is a screen shot of an example showing identification of an A-phase fault in an ungrounded shunt capacitor bank in a single WYE arrangement which was not fused.
Figure 13:
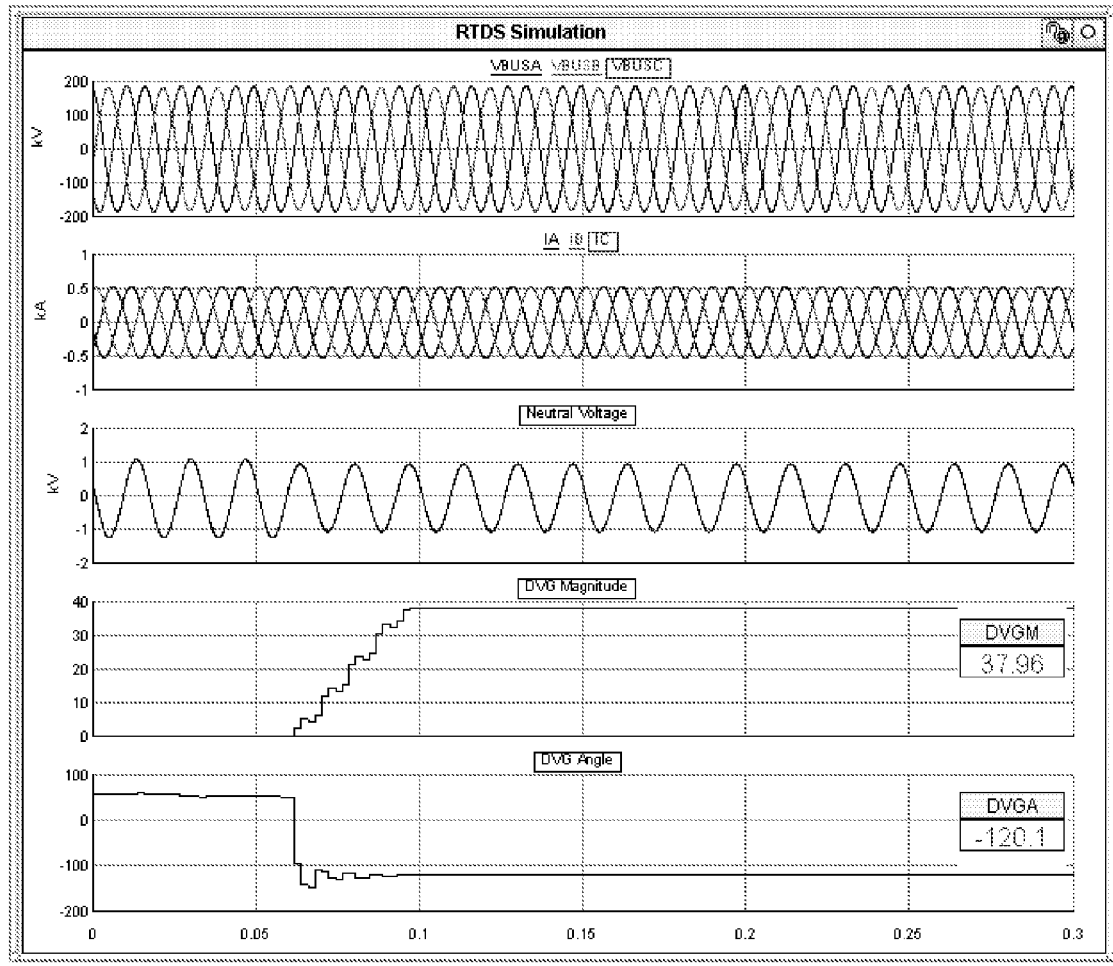
FIG. 13 is a screen shot of an example showing identification of a B-phase fault in an ungrounded shunt capacitor bank in a single WYE arrangement which was not fused.
Figure 14:
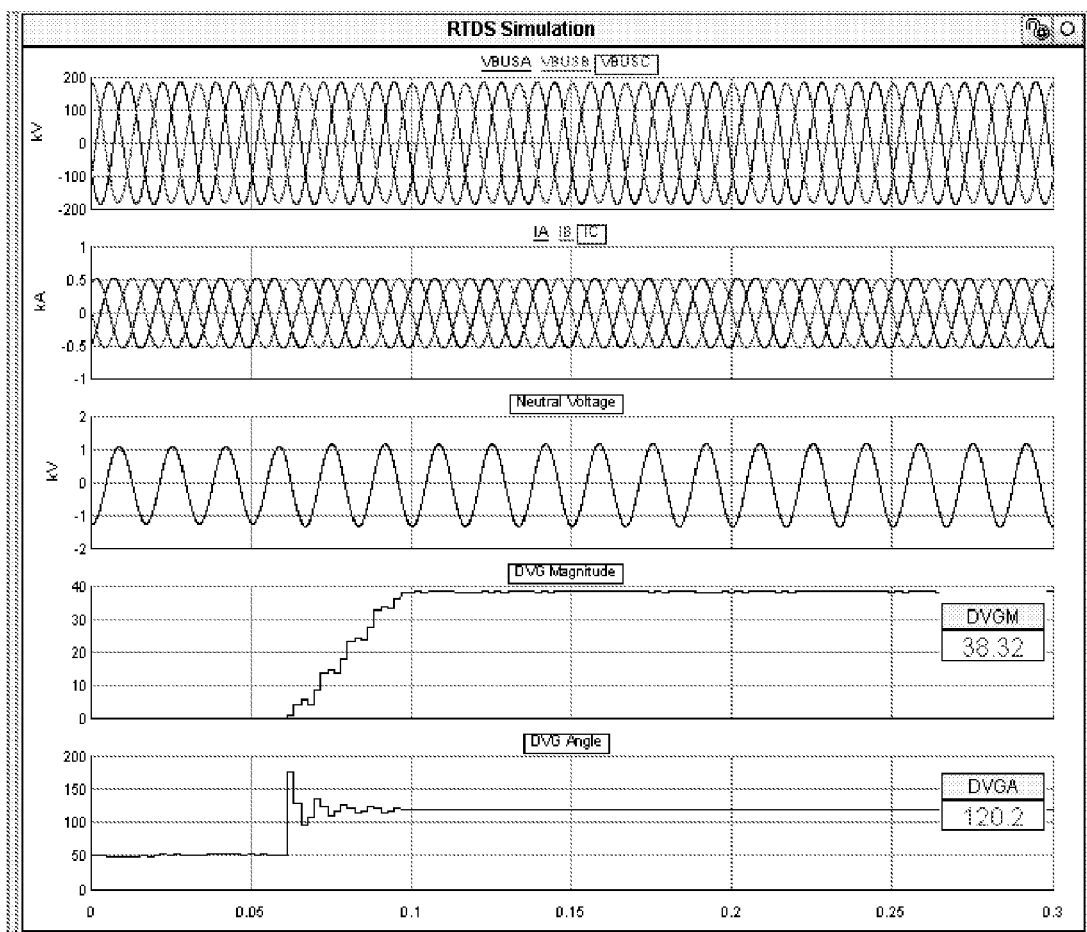
FIG. 14 is a screen shot of an example showing identification of a C-phase fault in an ungrounded shunt capacitor bank in a single WYE arrangement which was not fused.

FIGS. 12-14 illustrate examples of the protective device logic that was used to identify the faulted phase of an ungrounded shunt capacitor bank in a single WYE arrangement that was not fused. The shunt capacitor bank included 5 strings per phase, wherein each string had 12 units in series and each unit had 6 elements (or capacitors) in series. As shown in the Figures, the phase angle of the compensated neutral voltage ($\angle_{NG}$) was compared with the positive-sequence voltage phase angle ($\angle_{1G}$) at the busbar. In this arrangement, the source voltage was 230 kV and a neutral potential transformer measured the unbalance in the shunt capacitor bank. As shown in FIG. 12, there was a fault in capacitors associated with Phase A. More specifically, there was a compensated neutral voltage magnitude of 38.3V and a compensated neutral voltage phase of about −0.5°. As shown in FIG. 13, there was a fault in the capacitors associated with Phase-B. More specifically, there was a compensated neutral magnitude of 38.0V and a compensated neutral voltage phase of about −120.1°. As shown in FIG. 14, there was a fault in the capacitors associated with Phase-C. More specifically, there was a compensated neutral magnitude of 38.3V and a compensated neutral voltage phase of about 120.2°.

Example 2

FIGS. 15-20 illustrate examples of the protective device logic that was used to identify the faulted phase of two ungrounded shunt capacitor banks in a double WYE arrangement that was not fused. The shunt capacitor bank included 5 strings per phase on the left bank and 4 strings per phase on the right bank, wherein each string had 12 units in series and each unit had 6 elements. As shown in the Figures, the phase angle of the compensated neutral current ($\angle_{NG}$) was compared with the positive-sequence current phase angle ($\angle_{1G}$).

Figure 15:
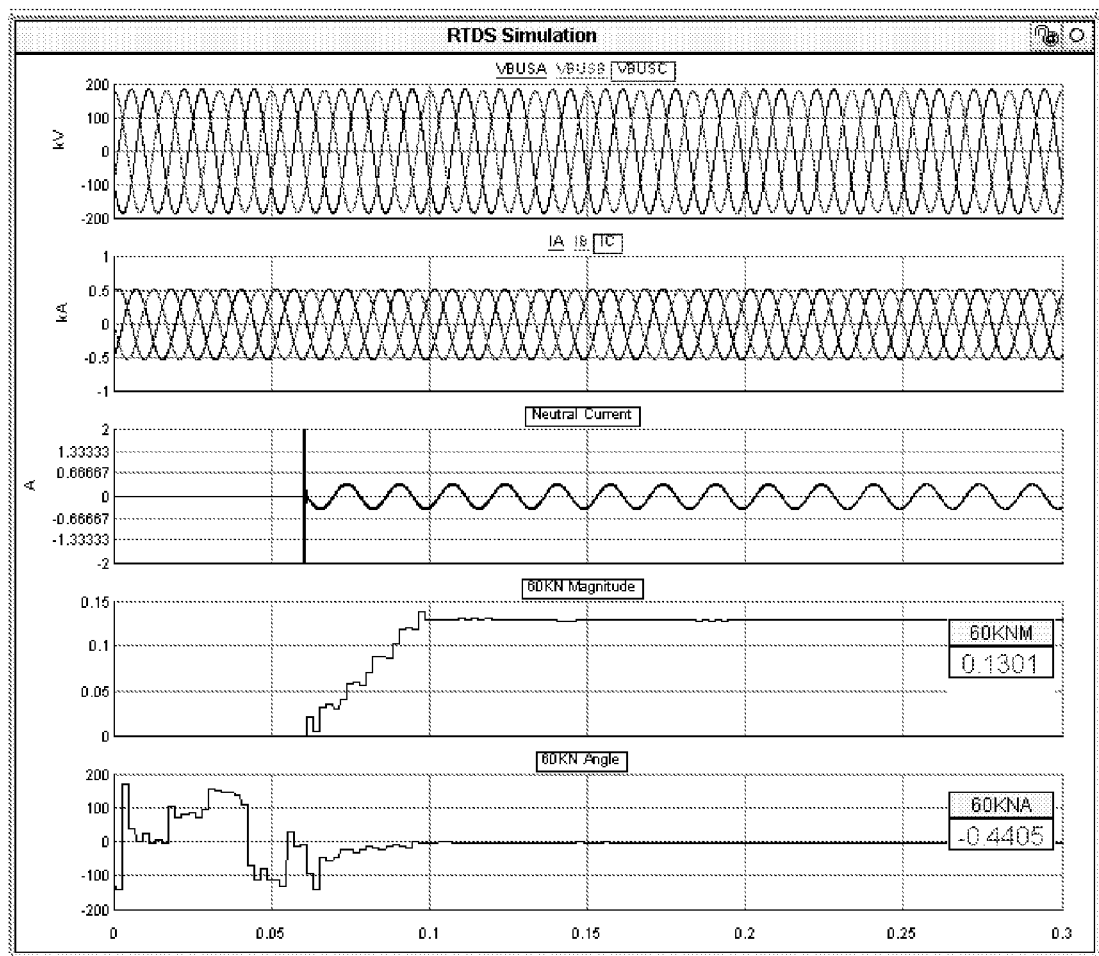
FIG. 15 is a screen shot of an example showing identification of an A-phase fault in the left bank of two ungrounded shunt capacitor banks in a double WYE arrangement which were not fused.
Figure 16:
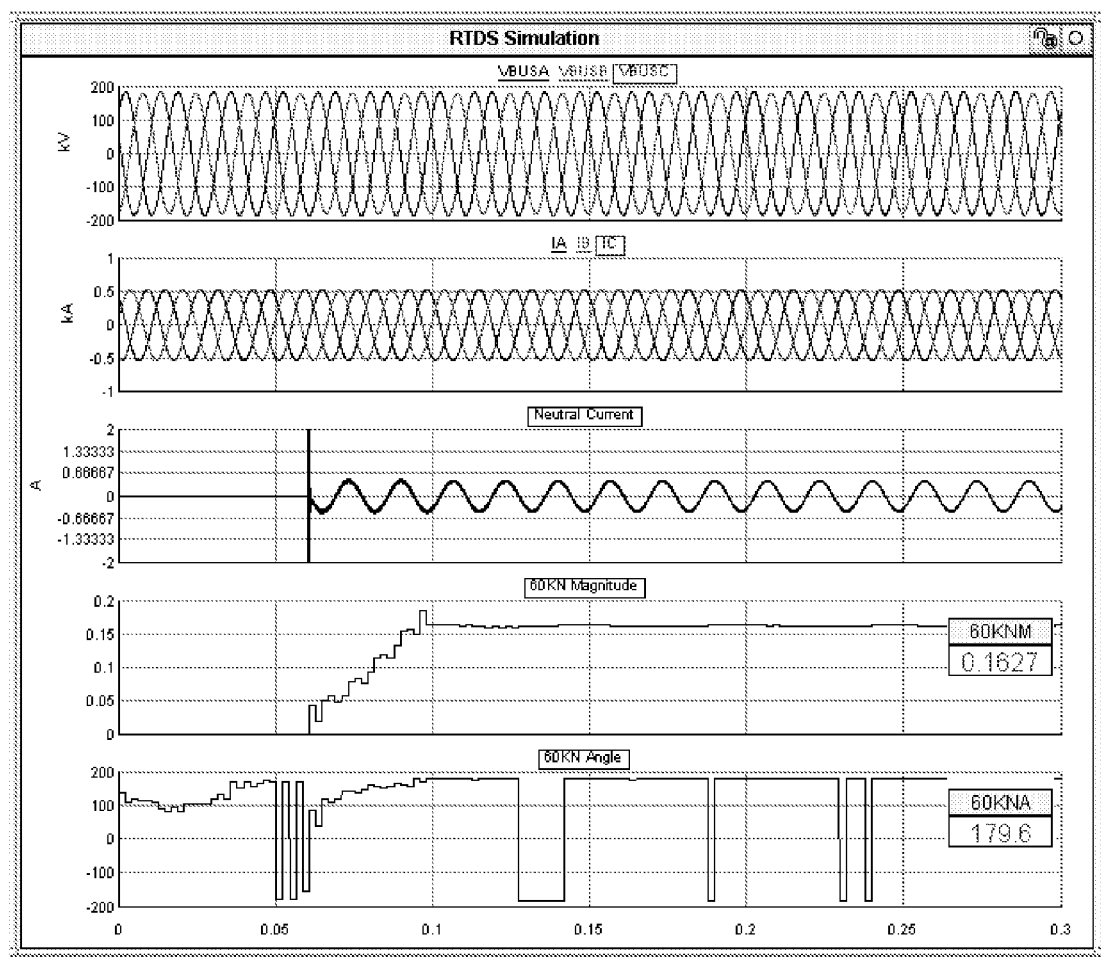
FIG. 16 is a screen shot of an example showing identification of an A-phase fault in the right bank of two ungrounded shunt capacitor banks in a double WYE arrangement which were not fused.
Figure 17:
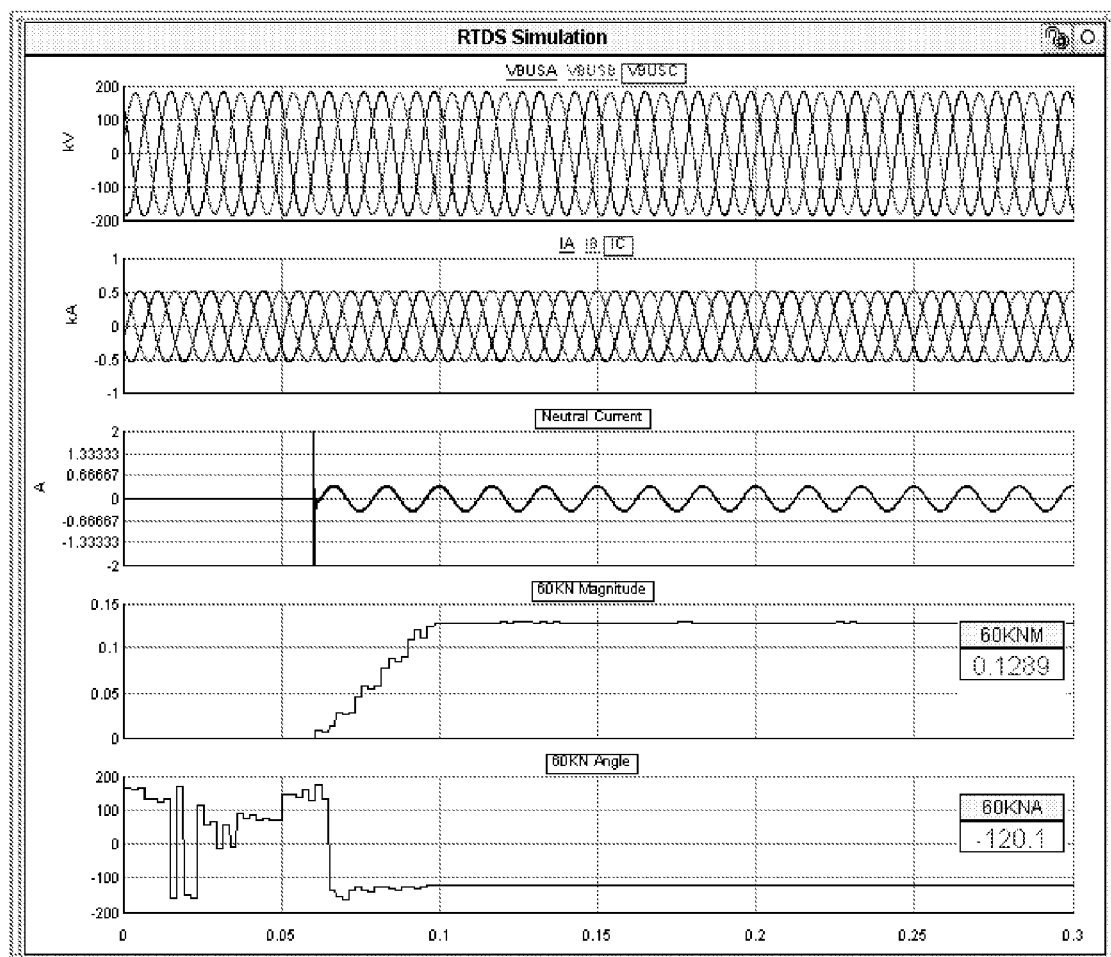
FIG. 17 is a screen shot of an example showing identification of a B-phase fault in the left bank of two ungrounded shunt capacitor banks in a double WYE arrangement which were not fused.
Figure 18:
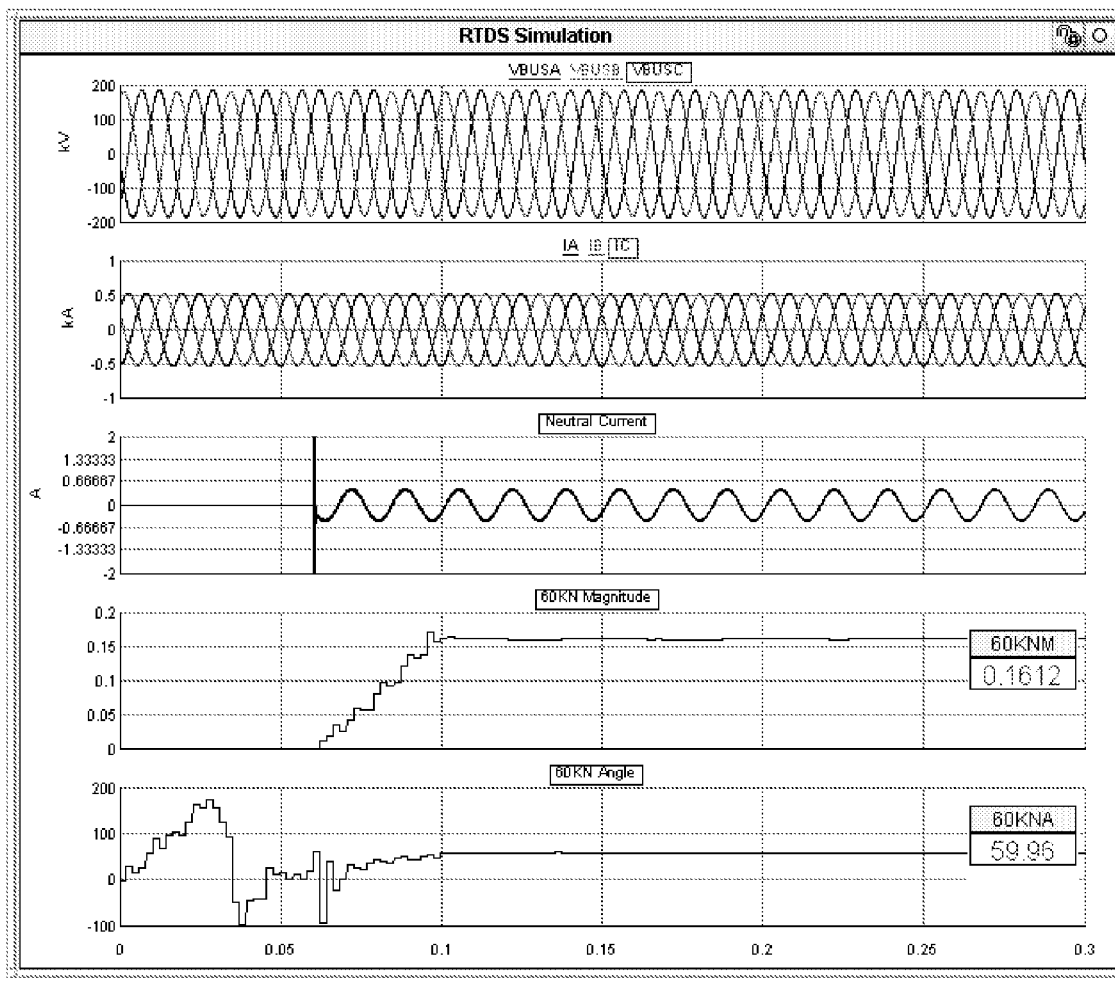
FIG. 18 is a screen shot of an example showing identification of a B-phase fault in the right bank of two ungrounded shunt capacitor banks in a double WYE arrangement which were not fused.
Figure 19:
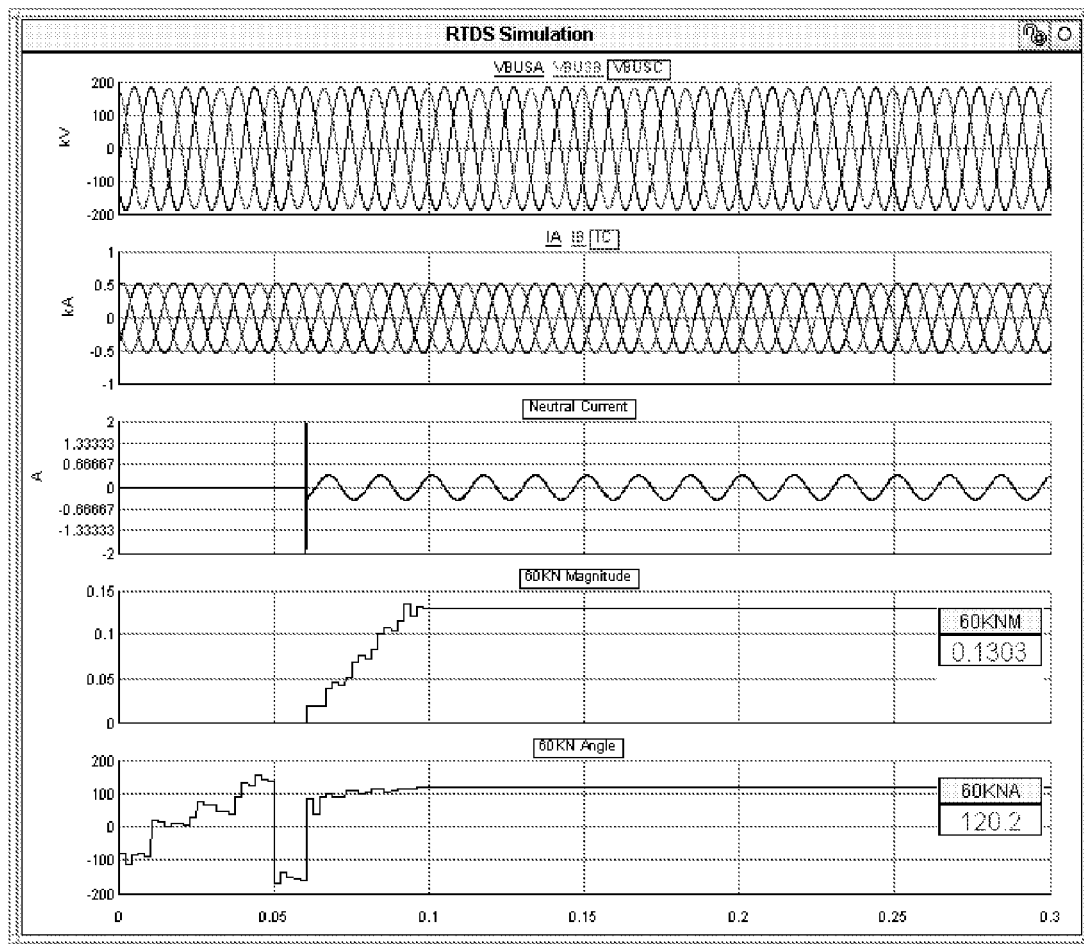
FIG. 19 is a screen shot of an example showing identification of a C-phase fault in the left bank of two ungrounded shunt capacitor banks in a double WYE arrangement which were not fused.
Figure 20:
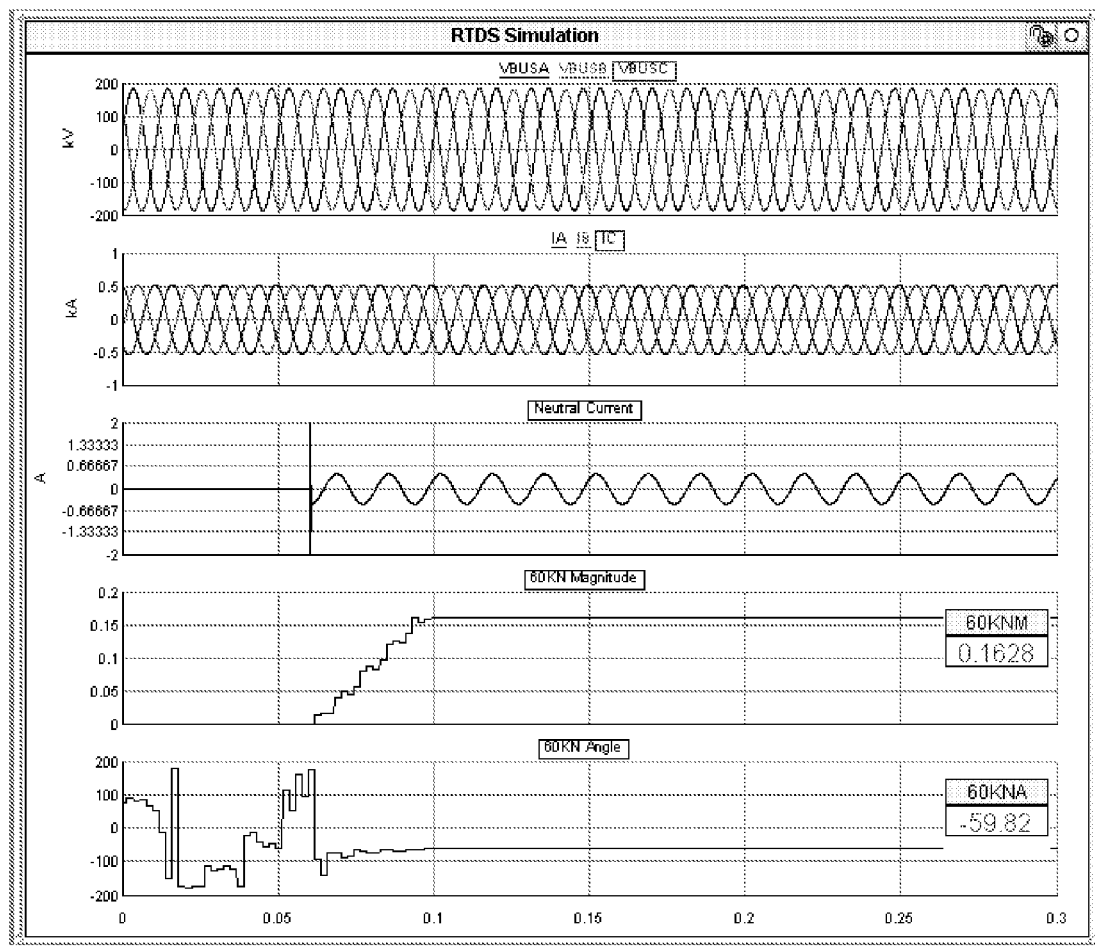
FIG. 20 is a screen shot of an example showing identification of a C-phase fault in the right bank of two ungrounded shunt capacitor banks in a double WYE arrangement which were not fused.

As shown in FIG. 15, there was a fault associated with the capacitors of Phase-A in the left shunt capacitor bank. More specifically, there was a compensated neutral current magnitude of 130.1 mA and a compensated neutral current phase of about −0.4°. As shown in FIG. 16, there was a fault associated with the capacitors of Phase-A in the right capacitor bank. More specifically, there was a compensated neutral current magnitude of 162.7 mA and a compensated neutral current phase of about 179.6°. As shown in FIG. 17, there was a fault associated with the capacitors of Phase-B in the left capacitor bank. More specifically, there was a compensated neutral current magnitude of 128.9 mA and a compensated neutral current phase of about −120.1°. As shown in FIG. 18, there was a fault associated with the capacitors of Phase-B in the right capacitor bank. More specifically, there was a compensated neutral current magnitude of 161.2 mA and a compensated neutral current phase of about 60.0°. As shown in FIG. 19, there was a fault associated with the capacitors of Phase-C in the left capacitor bank. More specifically, there was a compensated neutral current magnitude of 130.3 mA and a compensated neutral current phase of about 120.2°. As shown in FIG. 20, there was a fault associated with the capacitors of Phase-C in the right capacitor bank. More specifically, there was a compensated neutral current magnitude of 162.8 mA and a compensated neutral current phase of about −59.8°.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein.

For example, although the various embodiments are shown to involve capacitor banks in a single WYE or double WYE arrangement, the present invention apparatus and method may be applied to other capacitor bank arrangements including but not limited to H bridge that is grounded or ungrounded, double WYE ungrounded with a voltage transformer measuring the voltage between neutrals, double WYE that is grounded with a current transformer in each neutral for measuring the differential neutral current, single WYE ungrounded with voltage transformers connected in broken delta for measuring the neutral voltage, etc.

In another example, FIGS. 2-3 show the phase relationship if the reference phase angle is a positive sequence voltage angle. The reference phase angle may be ascertained from an associated voltage signal and/or current signal, or any transformation thereof including alpha-beta-gamma or d-q-0 or symmetrical components or any mathematical derivatives of those like sum, difference, product, scaling etc. of the voltage signal and/or current signal. Based on the type of reference phase angle selected, the phase relationship will change. In one example, instead of using the positive sequence voltage angle, the positive sequence current flowing into the capacitor bank is used. In this arrangement, the phase relationship will be offset by −90° (e.g., in FIG. 8, 0°, −120°, 120° is offset by −90° to −90°, 150°, 30°).

In another example, FIGS. 5-6 show the phase relationship if the reference phase angle is a positive sequence current angle. The reference phase angle may be ascertained from an associated voltage signal and/or current signal, or any transformation thereof including alpha-beta-gamma or d-q-0 or symmetrical components or any mathematical derivatives of those like sum, difference, product, scaling etc. of the voltage signal and/or current signal. Based on the type of reference phase angle selected, the phase relationship will change. In one example, instead of using the positive sequence current angle, the positive sequence voltage angle at the bus is used. In this arrangement, the phase relationship will be offset by 90° (e.g., in FIGS. 10 and 11, 0°, 180°, −120°, 60°, 120° and −60° is offset by 90° to 90°, −90°, −30°, 150°, −150° and 30°).

Furthermore, it will be appreciated that any such changes and modifications will be recognized by those skilled in the art as an equivalent to one or more elements of the following claims, and shall be covered by such claims to the fullest extent permitted by law.

The invention claimed is:

1. An apparatus for identifying which phase of a capacitor bank of a first ungrounded shunt capacitor bank or a second ungrounded shunt capacitor bank has a faulted capacitor element, the apparatus comprising:
a sampling circuit for sampling current or voltage signals associated with the first and second ungrounded shunt capacitor banks, and
a microcontroller coupled to the sampling circuit to determine a compensated neutral point phase angle from the sampled signal, wherein the compensated neutral point phase angle takes into account an inherent current or voltage unbalance in the ungrounded shunt capacitor banks, said microcontroller including:
a comparator to compare the compensated neutral point phase angle with a fixed reference phase angle to identify which phase of the first or second ungrounded shunt capacitor banks has the faulted capacitor element and to identify which of the first and second ungrounded shunt capacitor banks has the faulted capacitor element.

2. The apparatus of claim 1, wherein the fixed reference phase is the positive-sequence phase angle.

3. The apparatus of claim 1, wherein the microcontroller is further programmed to measure a zero sequence phase angle and a neutral point phase angle, said microcontroller being further programmed to determine the compensated neutral point phase angle as the difference between the neutral point phase angle and the zero sequence phase angle.

4. The apparatus of claim 1 wherein the microcontroller is further programmed to calculate transformations of the signal samples.

5. The apparatus of claim 1 wherein the microcontroller is further programmed to provide an alarm signal after identifying which phase has the faulted capacitor element.

6. The apparatus of claim 1 wherein the microcontroller is further programmed to provide a control signal after identifying which phase has the faulted capacitor element.

7. The apparatus of claim 1 wherein at least one of the first and second ungrounded shunt capacitor banks is fused.

8. The apparatus of claim 1 wherein at least one of the first and second ungrounded shunt capacitor banks is arranged in a WYE arrangement.

9. The apparatus of claim 1 wherein at least one of the first and second ungrounded shunt capacitor banks is arranged in an H bridge arrangement.

10. The apparatus of claim 1 wherein the microprocessor is adapted to compensate for unbalances outside of the capacitor banks.

11. The apparatus of claim 1 wherein the first and second capacitor banks comprise a double ungrounded shunt capacitor bank.

12. The apparatus of claim 1 wherein at least one of the first and second ungrounded shunt capacitor banks is fuseless or unfused.

13. A method for identifying which phase and capacitor bank of at least a first ungrounded shunt capacitor bank or a second ungrounded shunt capacitor bank has a faulted capacitor element, the method comprising the steps of:
sampling a current or voltage signal associated with the first and second ungrounded shunt capacitor banks,
determining a compensated neutral point phase angle from the sampled signal, wherein the compensated neutral point phase angle takes into account an inherent current or voltage unbalance in the ungrounded shunt capacitor banks, and
comparing the compensated neutral point phase angle with a fixed reference phase angle to identify which phase of the first or second ungrounded shunt capacitor banks has the faulted capacitor element and to identify which of the first or second ungrounded shunt capacitor banks has the faulted capacitor element.

14. The method of claim 13, wherein the fixed reference phase is a positive-sequence phase angle.

15. The method of claim 14, further including the step of determining the positive-sequence phase angle from the sampled signal.

16. The method of claim 14, further comprising the step of calculating transformations of the signal samples.

17. The method of claim 13, further including the steps of
determining a zero sequence phase angle from the sampled signal,
determining a neutral point phase angle, and
calculating the difference between the neutral point phase angle and the zero sequence phase angle to determine the compensated neutral point phase angle.

18. The method of claim 13, further comprising the step of providing an alarm signal after identifying which phase has the faulted capacitor element.

19. The method of claim 13, further comprising the step of providing a control signal after identifying which phase has the faulted capacitor element.

20. The method of claim 13 wherein at least one of the first and second ungrounded shunt capacitor banks is fused.

21. The method of claim 13 wherein at least one of the first and second ungrounded shunt capacitor banks is arranged in a WYE arrangement.

22. The method of claim 13 wherein at least one of the first and second ungrounded shunt capacitor banks is arranged in an H bridge arrangement.

23. The method of claim 13 wherein the fixed reference compensates for the shunt capacitor banks being fused.

24. The method of claim 13 wherein at least one of the first and second ungrounded shunt capacitor banks is fuseless or unfused.

25. An apparatus for identifying the location of a fault in at least a first ungrounded shunt capacitor bank or a second ungrounded shunt capacitor bank, the apparatus including:

a sampling circuit for sampling current or voltage signals associated with the first and second ungrounded shunt capacitor banks, and a microcontroller coupled to the sampling circuit, said microcontroller being programmed to:

determine a compensated neutral point phase angle from the sampled signal, wherein the compensated neutral point phase angle takes into account an inherent current or voltage unbalance in the ungrounded shunt capacitor banks, and compare the compensated neutral point phase angle with a fixed reference phase angle to identify which phase of the first and second ungrounded shunt capacitor banks has the faulted capacitor element and to identify which of the first and second ungrounded shunt capacitor bank includes the faulted capacitor element.

26. The apparatus of claim 25, wherein the fixed reference phase is the positive-sequence phase angle.

27. The apparatus of claim 25, wherein the microcontroller is further programmed to measure a zero sequence phase angle and a neutral point phase angle, said microcontroller being further programmed to determine the compensated neutral point phase angle as the difference between the neutral point phase angle and the zero sequence phase angle.

28. The apparatus of claim 25 wherein the microcontroller is further programmed to calculate transformations of the signal samples.

29. The apparatus of claim 25 wherein the microcontroller is further programmed to provide an alarm signal after identifying the location of the fault.

30. The apparatus of claim 25 wherein the microcontroller is further programmed to provide a control signal after identifying the location of the fault.

31. The apparatus of claim 25 wherein at least one of the first and second ungrounded shunt capacitor banks is fused.

32. The apparatus of claim 25 wherein at least one of the first and second ungrounded shunt capacitor banks is arranged in a double WYE arrangement.

33. The apparatus of claim 25 wherein the microprocessor is adapted to compensate for unbalances outside of the capacitor banks.

34. The apparatus of claim 25 wherein at least one of the first and second ungrounded shunt capacitor banks is fuseless or unfused.

* * * * *